United States Patent [19]
Angelopoulos et al.

[11] Patent Number: 6,140,462
[45] Date of Patent: Oct. 31, 2000

[54] OXIDATIVE/REDUCTIVE METHODS OF DEAGGREGATION OF ELECTRICALLY CONDUCTIVE POLYMERS AND PRECURSORS THEREOF AND METHODS OF FABRICATING ARTICLES THEREWITH

[75] Inventors: Marie Angelopoulos, Cortlandt Manor, N.Y.; Alan Graham MacDiarmid, Drexel Hill, Pa.; Weigong Zheng, Pasadena, Calif.

[73] Assignee: International Business Machines Corporation, Armonk, N.Y.

[21] Appl. No.: 09/043,622
[22] PCT Filed: Jul. 24, 1997
[86] PCT No.: PCT/US97/13378
 § 371 Date: Jul. 27, 1998
 § 102(e) Date: Jul. 27, 1998
[87] PCT Pub. No.: WO98/05044
 PCT Pub. Date: Feb. 5, 1998

Related U.S. Application Data

[60] Provisional application No. 60/022,706, Jul. 25, 1996.
[51] Int. Cl.$^7$ .................................................. C08G 73/00
[52] U.S. Cl. ........................ 528/422; 528/228; 528/229; 525/540; 525/422
[58] Field of Search .................................. 528/422, 228, 528/229; 525/540, 422

[56] References Cited

U.S. PATENT DOCUMENTS 5,258,472  11/1993  MacDiarmid et al. ................. 528/422

*Primary Examiner*—James J. Seidleck
*Assistant Examiner*—Olga Asinovsky
*Attorney, Agent, or Firm*—Thomas A. Beck; Daniel P. Morris

[57] ABSTRACT

The present invention is directed to oxidative and reductive methods of fabricating electrically conducting polymers and precursors thereof in particular polyanilines in which the polymer chains are deaggregated. Such deaggregated conducting polymers and precursors thereof exhibit better processability and higher electrical conductivity than do the corresponding aggregated polymers. Substituted and unsubstituted polyanilines in the substantially non oxidized or non reduced form (emeraldine form) are converted to an intermediate deaggregated reduced or oxidized form. The intermediate reduced or oxidized deaggregated form is processed into an article. The articles is subsequently treated with a dopant and an oxidizing or reducing agent to reform the original substantially non oxidized or non reduced form. The methods described herein permit the formation of articles such as shaped articles and films having deaggregated structure and higher electrical conductivity.

50 Claims, 5 Drawing Sheets

OXIDATIVE/REDUCTIVE METHODS OF DEAGGREGATION OF ELECTRICALLY CONDUCTIVE POLYMERS AND PRECURSORS THEREOF AND METHODS OF FABRICATING ARTICLES THEREWITH

CROSS REFERENCE TO RELATED APPLICATION

This application is a International 371 of PCT/US97/19378 filed Jul. 24, 1997 and also claims priority from Provisional Application U.S. Ser. No. 60/022,706 which was filed on Jul. 25, 1996.

The teaching of U.S. application Ser. No. 09/043623, filed on the same day herewith entitled, "VIBRATIONAL METHODS OF DEAGGREGATION OF ELECTRICALLY CONDUCTIVE POLYMERS AND PRECURSORS THEREOF" to M. Angelopoulos et al. is incorporated herein by reference.

The teaching of U.S. application Ser. No. 09/043,630, filed on the same day herewith entitled, "CONTROL OF POLYMERIZATION KINETICS AND RATE OF POLYMER PRECIPITATION AS A MEANS OF CONTROLLING THE AGGREGATION AND MORPHOLOGY IN CONDUCTIVE POLYMERS AND PRECURSORS THEREOF" to M. Angelopoulos et al. is incorporated herein by reference.

FIELD OF THE INVENTION

The present invention is directed to oxidative and reductive methods of fabricating electrically conducting polymers and precursors thereof and methods of fabricating articles therewith in which the polymer chains are deaggregated. Such deaggregated conducting polymers and precursors thereof exhibit better processability and higher electrical conductivity than do the corresponding aggregated polymers.

BACKGROUND OF THE INVENTION

Electrically conductive organic polymers have been of scientific and technological interest since the late 1970's. These relatively new materials exhibit the electronic and magnetic properties characteristic of metals while retaining the physical and mechanical properties associated with conventional organic polymers. Herein we describe electrically conducting polymers, for example polyparaphenylene vinylenes, polyparaphenylenes, polyanilines, polythiophenes, polyazines, polyfuranes, polypyrroles, polyselenophenes, poly-p-phenylene sulfides, polythianapthenes, polyacetylenes formed from soluble precursors, combinations thereof and blends thereof with other polymers and copolymers of the monomers thereof.

These polymers are conjugated systems which are made electrically conducting by doping. The non-doped or non-conducting form of the polymer is referred to herein as the precursor to the electrically conducting polymer. The doped or conducting form of the polymer is referred to herein as the conducting polymer.

Conducting polymers have potential for a large number of applications in such areas as electrostatic charge/discharge (ESC/ESD) protection, electromagnetic interference (EMI) shielding, resists, electroplating, corrosion protection of metals and ultimately metal replacements, i.e. wiring, plastic microcircuits, conducting pastes for various interconnection technologies (solder alternative) etc.. Many of the above applications especially those requiring high current capacity have not yet been realized because the conductivity of the processable conducting polymers is not yet adequate for such applications. In order for these materials to be used in place of metals in more applications, it is desirable to increase the conductivity of these materials. In addition, the processability of these polymers also requires improvement. Although some of these polymers are soluble, the solubility is generally limited and the solutions tend to be not stable over time.

The polyaniline class of conducting polymers has been shown to be one of the most promising and most suited conducting polymers for a broad range of commercial applications. The polymer has excellent environmental stability and offers a simple, one-step synthesis. However, the conductivity of the material in its most general form (unsubstituted polyaniline doped with hydrochloric acid) is generally on the low end of the metallic regime most typically, on the order of 1 to 10 S/cm (A. G. Macdiarmid and A. J. Epstein, Faraday Discuss. Chem. Soc. 88, 317, 1989). In addition, the processability of this class of polymers requires improvement. Although polyaniline is a soluble polymer, it has been noted that the solutions tend to be unstable with time. (E. J. OH et al, Synth. Met. 55–57, 977 (1993). Solutions of for example the polyaniline in the non-doped form tend to gel upon standing. Solutions greater than 5% solids concentration tend to gel within hours limiting the applicability of the polymer. It is desirable to devise methods of increasing the electrical conductivity of the doped polyanilines and to enhance the processability of these systems to allow broader applicability.

The conductivity ($\sigma$) is dependent on the number of carriers (n) set by the doping level, the charge on the carriers (q) and on the mobility (g) (both interchain and intrachain mobility) of the carriers.

$$\sigma = n\, q\, \mu$$

Generally, n (the number of carriers) in these systems is maximized and thus, the conductivity is dependent on the mobility of the carriers. To achieve higher conductivity, the mobility in these systems needs to be increased. The mobility, in turn, depends on the morphology of the polymer. The intrachain mobility depends on the degree of conjugation along the chain, presence of defects, and on the chain conformation. The interchain mobility depends on the interchain interactions, the interchain distance, and the degree of crystallinity. Thus, the conductivity is very dependent on the morphology of the polymer.

Recently, it has been shown that polyaniline in the non-doped form has a tendency to aggregate as a result of interchain hydrogen bonding and that this aggregation limits the solvation of the polymer (U.S. application Ser. No. 08/370,127 filed on Jan. 9, 1995 and U.S. application Ser. No. 08/370,128 filed on Jan. 9, 1995, the teachings of which are incorporated herein by reference). It was found that certain additives such as lithium chloride could be added to the polyaniline to disrupt the aggregation. As the aggregation was disrupted, the chains became disentangled from each other and the solvent was able to more effectively solvate the chains to adapt a more expanded chain conformation. As a result, the deaggregated polymer upon doping exhibited higher levels of conductivity than did the polymer in the aggregated form. In addition, it was found that the deaggregated solutions were more stable with time than the corresponding aggregated solutions.

Herein novel methods of deaggregating conducting polymers are described which involve oxidation and reduction reactions.

OBJECTS

It is an object of the present invention to deaggregate aggregated molecules which are precursors to the electrically conducting polymers.

It is an object of the present invention to deaggregate aggregated molecules which are precursors to the electrically conducting polymers so that the molecules can be more uniformly doped.

It is an object of the present invention to deaggregate aggregated molecules which are precursors to the electrically conducting polymers so that the molecules can exhibit high conductivity upon doping.

It is an object of the present invention to deaggregate aggregated molecules which are precursors to the electrically conducting polymers so that the molecules can exhibit good processability and good solution stability.

It is an object of the present invention to deaggregate aggregated molecules which are precursors to the electrically conducting polymers so that the molecules can be more effectively processed into articles, such as films, fibers, or any structural form or shaped article.

It is an object of the present invention to deaggregate aggregated molecules which are precursors to the electrically conducting polymers so that the molecules can be more effectively processed into films, fibers, or any structural form having tunable morphology and mechanical/physical properties.

It is an object of the present invention to deaggregate aggregated molecules which are electrically conducting polymers.

It is an object of the present invention to deaggregate aggregated molecules which are electrically conducting polymers so that the molecules can exhibit good processability and good solution stability.

It is an object of the present invention to deaggregate aggregated molecules which are electrically conducting polymers so that the molecules can be more effectively processed into films, fibers, or any structural form.

It is an object of the present invention to deaggregate aggregated molecules which are electrically conducting polymers so that the molecules can be more effectively processed into films, fibers, or any structural form having tunable morphology and mechanical/physical properties.

It is an object of the present invention to increase the electrical conductivity of electrically conductive polymers.

It is another object of the present invention to increase the electrical conductivity of electrically conductive polymers by extending the electrically conductive regions or islands of the electrically conductive polymer.

It is another object of the present invention to further increase the electrical conductivity of a deaggregated electrically conductive polymer by stretch orientation.

SUMMARY OF THE INVENTION

A broad aspect of the present invention is a method for fabricating electrically conducting polymers and precursors to electrically conducting polymers that are deaggregated. The deaggregated polymers exhibit increased solubility and processability, higher conductivity upon doping, and more uniform doping than do the corresponding aggregated polymers.

A more specific aspect of the present invention is a method of reducing or oxidizing substantially nonreduced or nonoxidized precursor polymers to an electrically conductive polymer in aggregated form to a reduced or oxidized deaggregated intermediate form which is formed into an article and subsequently doped and oxidized or reduced back to a nonreduced or nonoxidized form to result in a polymer having higher electrical conductivity than if the nonreduced or nonoxidized precusor is doped without first being reduced or oxidized.

A more specific aspect of a method of the present invention is deaggregating the precursor polymer or electrically conducting polymer either in solution or in the solid state by an oxidation or reduction reaction, the oxidation and reduction reaction preferably being chemically or electrochemically accomplished.

Another more specific aspect of a method of the present invention includes steps of providing a precursor to an electrically conducting polymer either in the solid state form such as a powder, film, fiber or structural part, or in solution; oxidizing or reducing the precursor by a chemical or electrochemical reaction thereby converting precursor to an oxidized or reduced form; adding a dopant to the oxidized or reduced precursor polymer; converting precursor polymer to original non-reduced or non-oxidized state. The dopant can be added to the oxidized or reduced polymer before the oxidized or reduced polymer is converted to the original non- reduced or non-oxidized form. Alternatively, the dopant can be added to the oxidized or reduced polymer after the oxidized or reduced polymer is converted to the original non-reduced or non- oxidized form. Alternatively, the dopant can be added to the oxidized or reduced polymer at the same time that the oxidized or reduced polymer is converted to the original non-reduced or non- oxidized form.

Another more specific aspect of a method of the present invention includes steps of providing a precursor to an electrically conducting polymer in solution; oxidizing or reducing the precursor in solution by a chemical or electrochemical reaction thereby converting precursor to an oxidized or reduced form; processing the solution of reduced or oxidized polymer into a powder, film, fiber, or structural part; doping and converting the precursor polymer to original non-reduced or non-oxidized state. The dopant can be added to the oxidized or reduced polymer before the oxidized or reduced polymer is converted to the original non-reduced or non-oxidized form. Alternatively, the dopant can be added to the oxidized or reduced polymer after the oxidized or reduced polymer is converted to the original non- reduced or non-oxidized form. Alternatively, the dopant can be added to the oxidized or reduced polymer at the same time that the oxidized or reduced polymer is converted to the original non-reduced or non-oxidized form.

Another more specific aspect of a method of the present invention includes steps of providing an electrically conducting polymer either in the solid state form such as a powder, film, fiber or structural part, or in solution; oxidizing or reducing the electrically conducting polymer by a chemical or electrochemical reaction thereby converting the polymer to an oxidized or reduced form; converting the polymer to original non-reduced or non-oxidized state.

Another more specific aspect of a method of the present invention includes steps of providing an electrically conducting polymer in solution; oxidizing or reducing said polymer in solution by a chemical or electrochemical reaction thereby converting polymer to an oxidized or reduced form; processing said solution of reduced or oxidized polymer into a powder, film, fiber, or structural part; converting said polymer to original non-reduced or non-oxidized state.

BRIEF DESCRIPTION OF THE DRAWINGS

Further objects, features, and advantages of the present invention will become apparent from a consideration of the following detailed description of the invention when read in conjunction with the drawing FIGS., in which.

DETAILED DESCRIPTION

The present invention is directed to methods of deaggregating electrically conducting polymer precursors and electrically conducting polymers. Examples of such polymers are of substituted and unsubstituted polyparaphenylenes, polyparaphenylevevinylenes. polyanilines, polyazines, polythiophenes, polythianaphthenes, poly-p-phenylene sulfides. polyfuranes, polypyrroles, polyselenophenes, polyacetylenes formed from soluble precursors and combinations thereof and copolymers of monomers thereof. The general formula for these polymers can be found in U.S. Pat. No. 5,198,153 to Angelopoulos et al. the teaching of which is incorporated herein by reference. The present invention is most suitable to one class of polymers which are substituted or unsubstituted polyaniline or copolymers of polyaniline having general formula shown in FIG. 1 wherein each R can be H or any organic or inorganic radical; each R can be the same or different; wherein each $R^1$ can be H or any organic or inorganic radical, each $R^1$ can be the same or different; $x \geq 1$; preferably x>2 and y has a value from 0 to 1. Examples of organic radicals are alkyl or aryl radicals. Examples of inorganic radicals are Si and Ge. This list is exemplary only and not limiting.

Figure 1A:
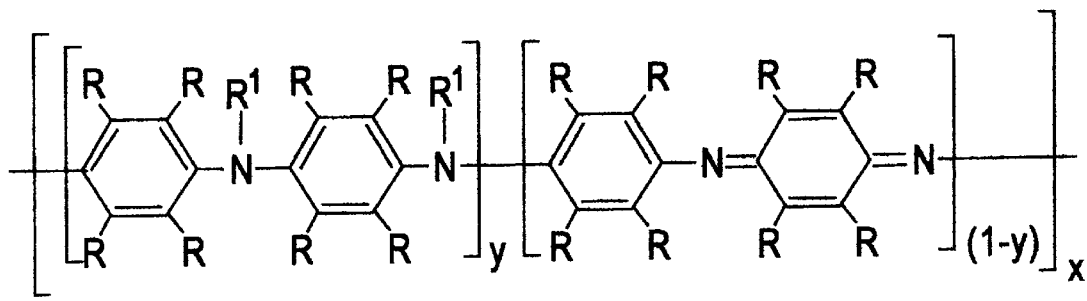
FIG. 1 is a general formula for a polyaniline; (a) is the precursor form of the polymer or the non-doped form of the polymer; (b) is the doped form of the polymer or the electrically conducting form of polyaniline; (c) is the actual structure for the doped electrically conducting polymer consisting of a polysemiquinone radical cation.
Figure 1B:
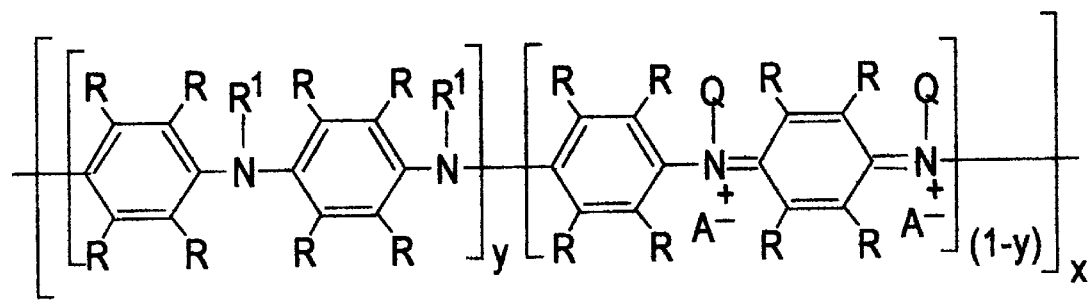

The precursor to the electrically conducting polymer form is shown in FIG. 1a. This is the non-doped form of the polymer or the base polymer. FIG. 1b shows polyaniline doped with a dopant. If the polyaniline base is exposed to cationic species QA, the nitrogen atoms of the imine part of the polymer becomes substituted with the Q+ cation to form an emeraldine salt as shown in FIG. 1b. Q+ can be selected from H+ and organic or inorganic cations, for example, an alkyl group or a metal.

Figure 1C:
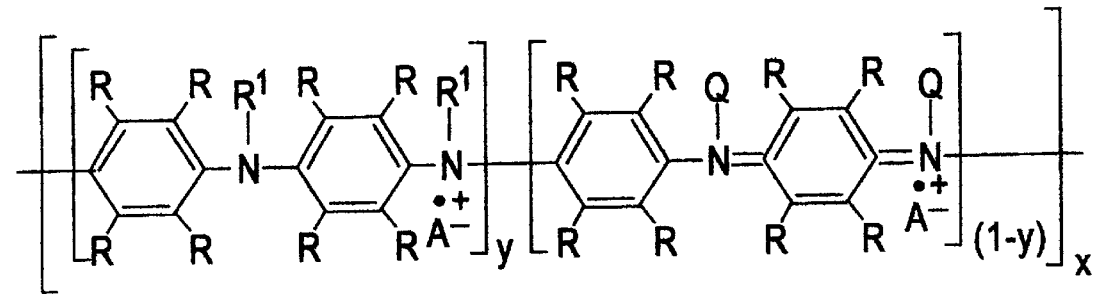

QA can be a protic acid where Q is hydrogen. When a protic acid HA is used to dope the polyaniline, the nitrogen atoms of the imine part of the polyaniline are protonated. The emeraldine base form is greatly stabilized by resonance effects. The charges distribute through the nitrogen atoms and aromatic rings making the imine and amine nitrogens indistinguishable. The actual structure of the doped form is a delocalized polysemiquinone radical cation as shown in FIG. 1c.

Polyaniline can exist in a number of oxidation states. The emeraldine form of the polymer refers to the material that consists of approximately equal number of benzenoid units and quinoid units (y=≈0.5 in FIG. 1). The emeraldine polymer can be reduced to the leucoemeraldine polymer where y=1 in FIG. 1. The leucoemeraldine base form of the polymer is not stable in ambient conditions. The emeraldine polymer can be oxidized to the pernigraniline form where y=0; however, the fully oxidized form of the polymer also tends not to be stable. In principle, other oxidation states intermediate between y=0 and y=1 are possible. The emeraldine base form of the polyaniline is the most stable form. Because of its environmental stability, it is the form of polyaniline that has been the most abundantly studied and is the form that is suited for technological applications.

The emeraldine base form of polyaniline is soluble in various organic solvents and in various aqueous acid solutions. Examples of organic solvents are dimethylsulfoxide (DMSO), dimethylformamide (DMF), N-methylpyrrolidinone (NMP), N,N'-dimethyl propylene urea (DMPU), pyridine, m-cresol, phenol and so on. This list is exemplary only and not limiting. Examples of aqueous acid solutions is aqueous acetic acid and formic acid solutions. This list is exemplary only and not limiting.

Figure 2:
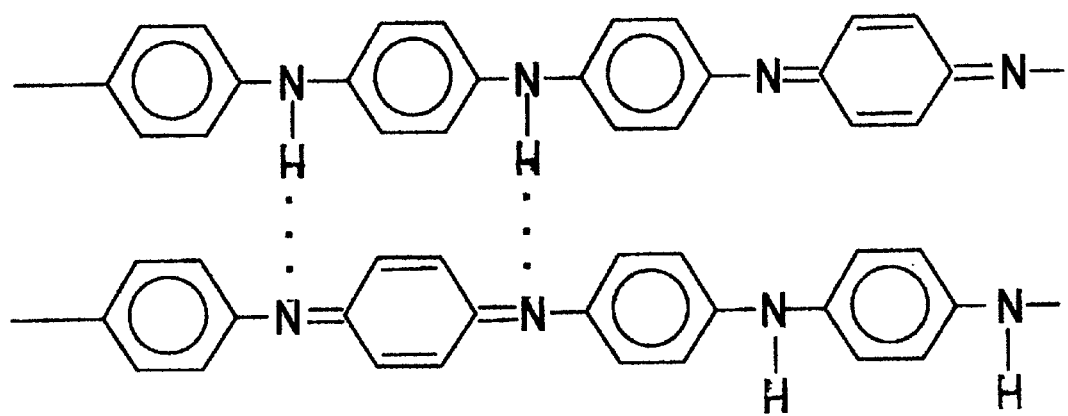
FIG. 2 depicts interchain hydrogen bonding in emeraldine base between an amine site of one chain and an imine site of a second chain.
Figure 3:
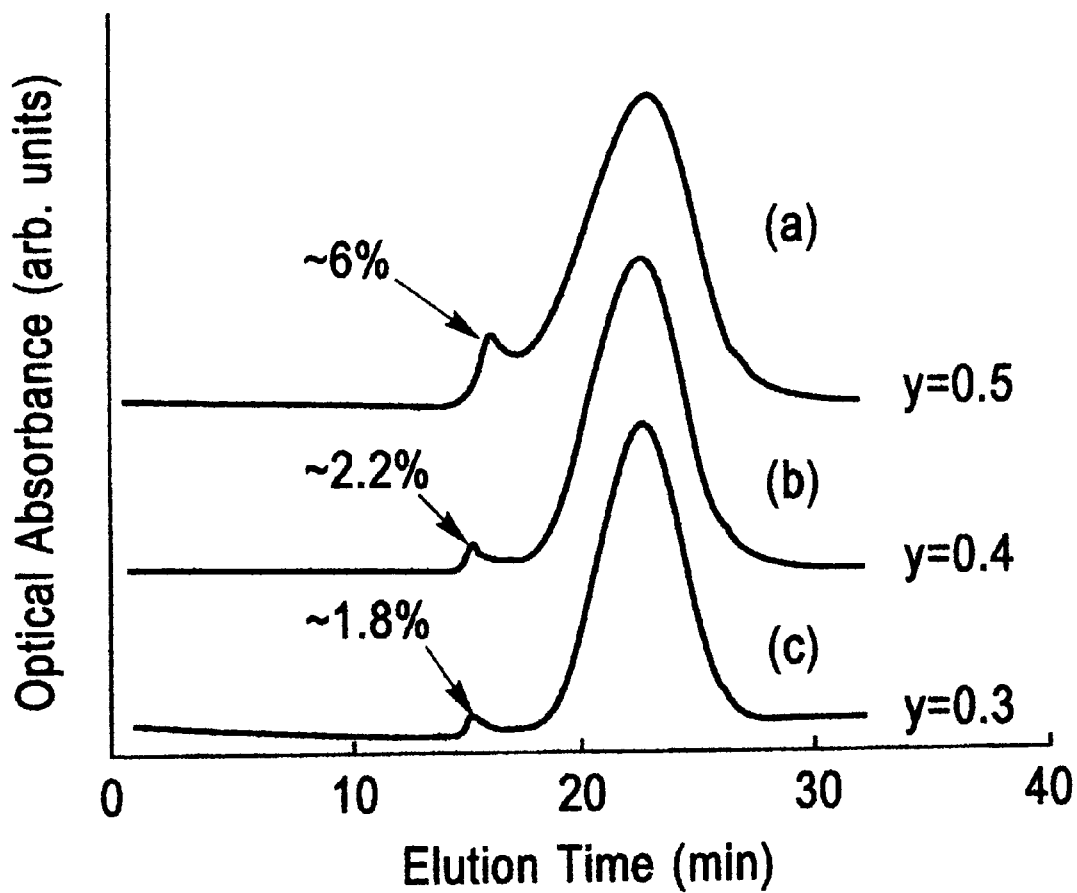
FIG. 3 depicts gel permeation chromatographs (GPC) of polyaniline base in the emeraldine base in NMP (a); of partly reduced emeraldine base in NMP by the addition of hydrazine (b); and more fully reduced emeraldine base in NMP by the addition of more hydrazine (c). As can be seen, the high molecular weight fraction decreases as the polymer is more fully reduced.

Previously we disclosed (U.S. Ser. No. 08/370,127 filed on Jan. 9, 1995 and U.S. application Ser. No. 08/370,128 filed on Jan. 9, 1995, the teachings of which are incorporated herein by reference.) that polyaniline in the emeraldine base form aggregates as a result of interchain hydrogen bonding between the amine and imine sites as shown schematically in FIG. 2. These aggregates were evidenced by a bimodal molecular weight distribution in gel permeation chromatography. Emeraldine base in NMP for example exhibits a bimodal distribution as is shown in FIG. 3a. In this particular chromatograph, the area of the high molecular weight fraction is on the order of 6%. This high molecular weight fraction is due to chain aggregation resulting in "pseudo" high molecular weights. Previously we disclosed that certain additives such as lithium chloride could be added to these solutions to disrupt the hydrogen bonding and in turn reduce or eliminate the high molecular weight fractions. Herein, we disclose novel methods of disrupting the aggregation of emeraldine base which involves first reducing or oxidizing the emeraldine base to a different oxidation state and then processing the material in this form followed by conversion to its original environmentally stable emeraldine form.

It is found that upon reduction of emeraldine base towards the leucoemeraldine form, the high molecular weight fraction in the GPC decreases as is shown in FIGS. 3b and c. Hydrazine, a reducing agent, is added to the emeraldine base solution in various amounts. The partly reduced product is titrated to determine its oxidation state. The chromatographs depicted in FIGS. 3b and 3c correspond to a reduced polyaniline in which 1−y=0.4 and 1−y=0.3 in equation shown in FIG. 1. As can be seen, as the polyaniline in the emeraldine base form is reduced, the high molecular weight fraction dramatically decreases indicating that the aggregation is disrupted.

Figure 4A:
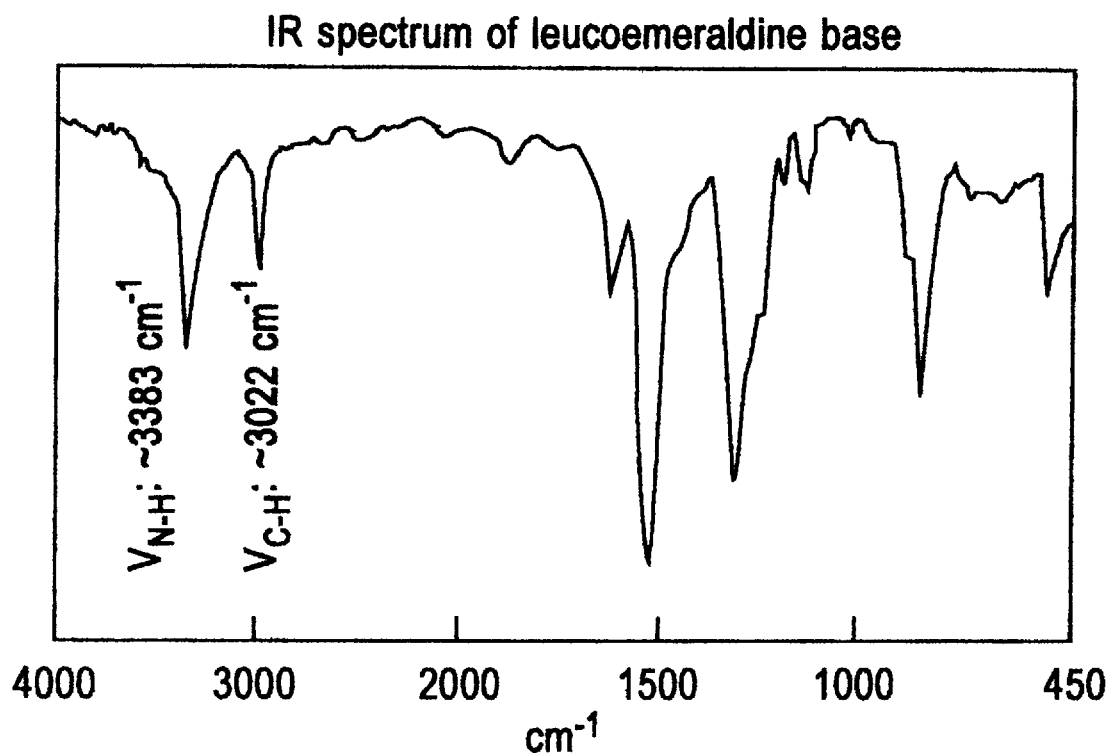
FIG. 4 depicts infra-red spectra for a polyaniline base in the reduced, leucoemeraldine base form, and for the emeraldine base form.
Figure 4B:
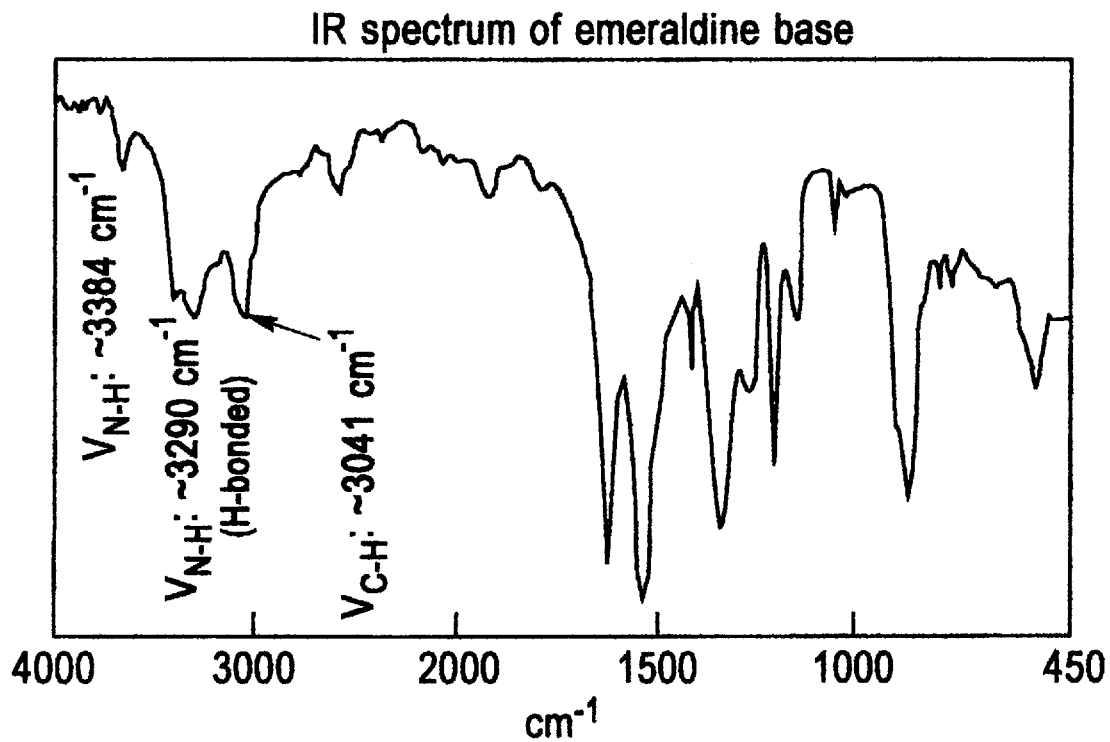

FIG. 4 depicts the infra-red (IR) spectrum for the polyaniline, emeraldine base powder (b) and for a fully reduced, leucoemeraldine base polymer (a). The IR shows two distinct N—H stretching bands for the emeraldine base—a major broad band located at 3290 cm-1 and a minor sharp band located at 3383 cm-1. In contrast, the spectrum of leucoemeraldine base shows only one sharp N—H band located at 3384 cm-1 associated with a free (non-hydrogen bonded) N—H stretching vibration. The band at 3290 seen in emeraldine base is due to a hydrogen-bonded N—H stretching vibration.

Figure 5:
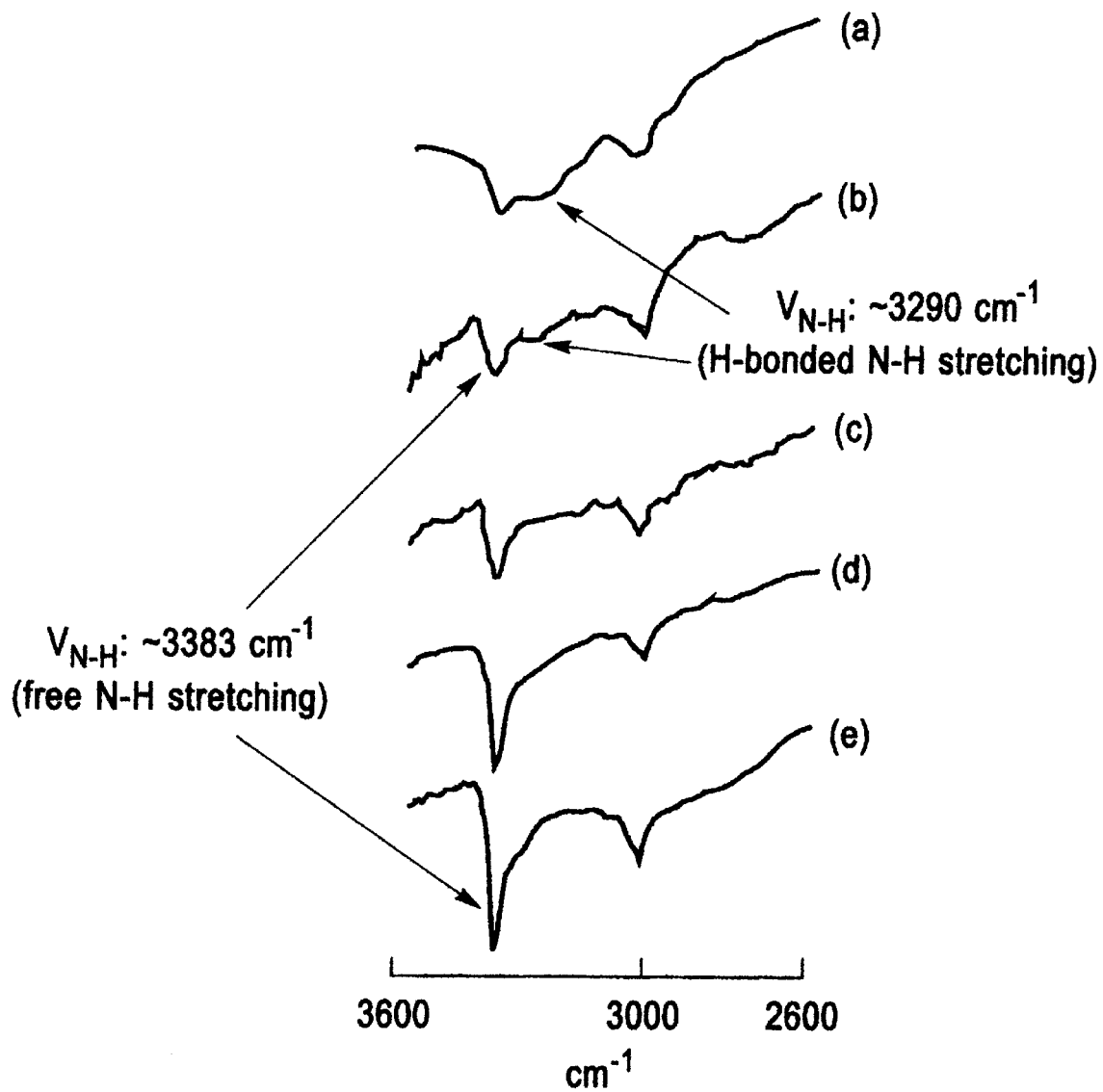
FIG. 5 depicts the changes in the infra-red spectra observed as the emeraldine base is reduced to the leucoemeraldine base. (a) emeraldine base film (b) film after treatment with hydrazine vapor for 15 minutes (c) film after treatment with hydrazine vapor for 30 minutes (d) film after treatment with hydrazine vapor for 1 hour and (e) film after treatment with hydrazine vapor for 12 hours. As can be seen, the H-bonded N—H stretching band decreases as the emeraldine base polymer is reduced.

Emeraldine base is a mixed oxidation state polymer containing amine and imine sites whereas leucoemeraldine base contains only amine sites. The infra-red data shows that the hydrogen-bonding between amine and imine sites is stronger than amine-amine hydrogen bonding and thus significant hydrogen-bonding and in turn aggregation is observed in emeraldine base whereas no significant hydrogen-bonding and in turn aggregation is observed in leucoemeraldine base. FIG. 5 shows that as an emeraldine base film is treated to hydrazine vapor in-situ, a progressive marked decrease in the hydrogen-bonded N—H stretching band is observed with a concomitant increase in the free N—H stretch.

Oxidation of emeraldine base to the pernigraniline form which results in only imine sites on the polymer backbone also eliminates hydrogen bonding and thus, aggregation. Although the aggregation of emeraldine base is eliminated upon reduction to the leucoemeraldine form or upon oxidation to the pernigraniline form, the polymer can not in practice be used in these forms as they are unstable in ambient conditions. In addition, doping of leucoemeraldine base or pernigraniline base does not produce a significantly conducting form. It is the polymer in the emeraldine form that gives the highest conductivity to date as compared to the other oxidation states.

The aggregation in emeraldine base limits the solubility of the polymer. The more aggregated the emeraldine base, the less soluble is the polymer. In addition, the aggregation induces the solutions of this polymer to gel especially at concentrations above 5%. Thus, the solutions of aggregated emeraldine base are not stable. Furthermore, the aggregation in emeraldine base limits the doping uniformity and efficiency; it also limits the conductivity; and prevents the chains from adapting a crystalline structure.

Thus, it is important to reduce the aggregation of emeraldine base but to be able to maintain the polymer in this oxidation state in the end. What is needed is for emeraldine base to be able to be first converted to a transient form, i.e. the reduced or oxidized form, but then to be able to reconvert back to the emeraldine polymer without having the polymer reaggregate in the process. This can be done in several methods. First the emeraldine base in the solid state, e.g. powder, film, fiber, structural part or in solution is reduced to the leucoemeraldine form or oxidized to the pernigraniline form by the addition of a reducing agent or oxidizing agent respectively or electrochemically by the application of appropriate potential. The transient leucoemeraldine/pernigraniline form of the polymer is then treated with a dopant suitable for the emeraldine base and reoxidized or rereduced by treatment with a reducing agent or oxidizing agent or electrochemically to isolate the doped emeraldine deaggregated polymer. The dopant and oxidizing/reducing agent used to reform the emeraldine polymer can be added together or the dopant can be added first followed by the redox reagent. To prevent reaggregation it is not desirable to add the redox reagent first prior to the dopant. Otherwise, the polymer in the non-doped emeraldine base will reform and can reaggregate in the process. In the preferred embodiment, the reduced or oxidized form of the polymer is treated with a dopant followed by the oxidizing or reducing agent. In this fashion, as the emeraldine polymer is formed, it will be formed in the doped form. In the doped form, the imine sites are reacted and are not available for hydrogen bonding.

A second method involves forming an emeraldine base solution. To this solution is added a reducing agent or an oxidizing agent or is treated electrochemically by applying a potential to convert the polymer in solution to the leucoemeraldine base or to the pernigraniline base. This solution is then processed into a film, fiber, or a structural part. The processed film, fiber, structural part is then treated with a dopant and an oxidant or reducing agent to reform the doped emeraldine form of the polymer.

A third method involves taking the doped emeraldine salt in the solid state form, i.e. powder, film, fiber, or structural part or in solution and reducing the doped polymer or oxidizing the doped polymer or treating it electrochemically to form the leucoemeraldine or pernigraniline form in the presence of the dopant. The reduced or oxidized form of the polymer is then reconverted to the emeraldine polymer. While in the reduced or oxidized form, the polymer in solution or powder or film or fiber or structural part could be processed further by thermal or mechanical processing prior to the conversion to the emeraldine form.

The emeraldine form in which y=≅0.5 in FIG. 1 can be reduced or oxidized as above but the reduction or oxidation does not need to go to completion, i.e. reaching y=1 or y=0. The fully reduced polymer (y=1) and the fully oxidized polymer (y=0) exhibit the least aggregation and is the preferred method, however, reduction of emeraldine base to levels less than y=0.5 or oxidation to levels above y=0.5 will reduce the aggregation to some extent; the more reduced or more oxidized it is the more deaggregated the structure. This was seen in FIG. 3 where reduced levels of 1−y=0.4 or y=0.6 and 1=y=0.3 or y=0.7 are reached and significant reduction in aggregation is observed. The degree of oxidation/reduction is controlled by the amount of oxidizing or reducing agent that is added and also by the amount of time the reaction is allowed to take place and on the reaction conditions.

An exemplary list of reducing agents include hydrazine, phenylhydrazine, other substituted hydrazines, titanium chloride, hydrogen,lithium aluminum hydride, zinc, raney nickel, and so on. An exemplary list of oxidizing agents include $FeCl_3$, hydrogen peroxide, oxygen, periodates such as sodium periodate, chromates such as potassium dichromate, ammonium peroxydisulfate, peracids such m-chloroperoxybenzoic acid lead acetate and so on. The oxidation/reduction can also be carried out electrochemically by the application of a potential.

An exemplary list of solvents useful to practice the present invention is:

N-methyl pyrrolidinone (NMP)
dimethyl sulfoxide (DMSO)
dimethyl formamide (DMF)
pyridine
toluene
xylene
m-cresol
phenol
dimethylacetamide
tetramethylurea
n-cyclohexylpyrrolidinone aqueous acetic acid aqueous formic acid pyrrolidinone N, N' dimethyl propylene urea (DMPU)

benzyl alcohol water

An exemplary list of dopants which can be used to dope the polymer to the conducting state are: hydrochloric acid, acetic acid, formic acid, oxalic acid, toluenesulfonic acid, dodecylbenzene sulfonic acid, benzenesulfonic acid, naphthalene sulfonic acid, methyliodide and camphor sulfonic acid, acrylamidopropanesulfonic acid, and so on.

EXAMPLES

The unsubstitued polyaniline in the emeraldine form is synthesized by the chemical oxidative polymerization of aniline in IN HCl using ammonium peroxydisulfate as an oxidizer. Polyaniline can also be oxidatively polymerized electrochemically as taught by W. Huang, B. Humphrey, and A. G. MacDiarmid, J. Chem. Soc. Faraday Trans. 1,82, 2385, 1986. In the chemical synthesis, the conducting polyaniline hydrochloride (emeraldine hydrochloride) salt precipitates from solution. The polymerization is allowed to proceed for several hours after which the powder is filtered, washed with excess 1N hydrochloric acid. The emeraldine hydrochloride is then converted to the non-conducting or non-doped emeraldine base by reaction with 0.1M ammonium hydroxide. The emeraldine base is then filtered, washed with ammonium hydroxide, then washed with methanol and dried. The polymer at this stage is in the undoped emeraldine base form as a powder.

Substituted (either on the aromatic ring or on the nitrogen) polyanilines in the emeraldine form are synthesized in the same fashion as above but using the appropriate substituted aniline monomer in the polymerization reaction. Copolymers are made by the oxidative polymerization of one or more monomers. Other acids can also be used in the polymerization reaction other than hydrochloric acid. Aqueous acetic acid, sulfuric acid, organic sulfonic acids, such as aqueous toluenesulfonic acid, dodecylbenzenesulfonic acid, camphorsulfonic acid, and so on. The o-ethoxy substituted polyaniline was prepared by oxidative polymerization of o-ethoxy aniline in 1N hydrochloric acid as described above. Copolymers having various amounts of o-ethoxy content were synthesized by polymerizing o-ethoxyaniline and aniline in aqueous 1N hydrochloric acid. The amount of o-ethoxy content in the final polymer was controlled by varying the feed ratio of this monomer in the initial polymerization reaction. Other ring substituted derivatives such as o-hydroxyethyl ring substituted derivative as described in U.S. application Ser. No. 08/595,853 filed on Feb. 2, 1996 entitled "Cross-Linked Electrically Conductive Polymers and Precursors Thereof" and U.S. application Ser. No. 08/594,680 filed on Feb. 2, 1996 entitled "Methods of Fabricating Cross-Linked Electrically Conductive Polymers and Precursors Thereof" the teachings of which are incorporated herein by reference.

The substituted and unsubstituted emeraldine base powder is generally processed by dissolving the powder in an organic solvent. The unsubstituted emeraldine base was dissolved in NMP at a 5–10% concentration. The solution was used to spin-coat films of the emeraldine base polymer on silicon wafers, quartz wafers, salt plates, and so on. These films were on the order of 500 Å to 1.0 $\mu$m. Thicker films (on the order of 50 to 200 $\mu$m) were made by solution casting techniques in which the solution was poured into an aluminum pan or glass dish and placed into a vacuum oven at 60° C. for 24 hours. The solution can also be used to process the material into a structural part or into a fiber. The substituted emeraldine base such as the o-ethoxy substituted emeraldine base was more soluble than the unsubstituted emeraldine base. This polymer can be dissolved in cyclohexanone, tetrahydrofuran, ethyllactate and so on. A solution was made in cyclohexanone (5% solids) and this solution was used to process films (thin and thick).

Thin films of emeraldine base (substituted and unsubstituted) on quartz and salt plates were treated to hydrazine by exposing the films to the vapor of hydrazine. The films were exposed for various times. The longer the films were exposed to hydrazine, the more reduced were the polymers as can be seen in FIG. 5 which depicts the infra-red changes that occur upon reduction for the unsubstituted emeraldine base case. As can be seen the hydrogen bonded N—H band is eliminated and a single N—H stretching band is observed which is characteristic of the leucoemeraldine base. The emeraldine base powder was reduced by placing the polymer in a hydrazine solution. Upon reduction, the excess hydrazine was extracted from the sample by washing with methanol followed by pumping under vacuum. Films of the emeraldine base can also be reduced by placing the films in a hydrazine solution. Alternatively, hydrazine can be added to a solution of the emeraldine base to reduce the polymer in solution. All the reduction reactions were done under an inert atmosphere (nitrogen). The degree to which the polymer was reduced was controlled by the amount of hydrazine added and the time the reaction was allowed to take place. The degree of reduction in the final polymer was quantitatively determined by titration with an oxidizing agent such as potassium chromate.

The emeraldine polymer can also be oxidized in a similar fashion to that described above for the reduction case. The oxidizing agent can be iron trichloride, potassium chromate, and so on.

Once the emeraldine base is reduced either in the solid state form or in solution (under an inert atmosphere), a suitable dopant for the emeraldine form of the polymer such as a sulfonic acid, e.g. camphor sulfonic acid etc. is added followed by conversion of the reduced or oxidized form of the polymer back to the doped emeraldine form. The conversion is done by treatment of the reduced polymer with an oxidizing agent and the oxidized polymer with a reducing agent. The dopant and the suitable oxidizing agent or reducing agent can be added simultaneously to the reduced form or oxidized form of the polymer.

The doped emeraldine salt such as emeraldine hydrochloride, emeraldine toluenesulfonate, emeraldine camphorsulfonate, and so on can also be treated with a reducing agent or oxidizing agent to convert the polymer to the reduced and oxidized polymer in the presence of the dopant. Since the dopant is already present, in order to reconvert the polymer back to the emeraldine base, only an oxidizing agent or reducing agent needs to be added. No dopant is necessary.

An Emeraldine base solution or an emeraldine salt solution is treated with hydrazine or hydrogen peroxide under an inert atmosphere to convert the emeraldine base or salt to the reduced form or oxidized form respectively. Once the reduced or oxidized form is generated, this form of the polymer is processed into a film by solution casting methods, into a fiber, or into a structural part by thermal processing. Once it has been processed, the doped emeraldine form is regenerated by suitable oxidation or reduction.

All references referred to herein are incorporated herein by reference.

While the present invention has been described with respect to preferred embodiments, numerous modifications, changes, and improvements will occur to those skilled in the art without departing from the spirit and scope of the indention.

What is claimed is:

1. A method comprising the following steps in sequence:
   reducing or oxidizing a precursor to an electrically conductive polymer in substantially nonreduced or non oxidized form to an intermediate reduced or oxidized form;
   forming a shaped article from said intermediate reduced or oxidized form;
   exposing said shaped article to a dopant oxidizing or reducing said shaped article to form a doped article in substantially non oxidized or non reduced form.

2. A method according to claim 1 wherein said exposing of said article to a dopant is done before said oxidizing or reducing of said article.

3. A method according to claim 1 wherein said exposing of said article to a dopant is done after said oxidizing or reducing of said article.

4. A method according to claim 1 wherein said exposing of said article to a dopant is done at the same time as said oxidizing or reducing of said article.

5. A method according to claim 1 wherein said forming of said article is done after said exposing of said article to a dopant.

6. A method according to claim 1 wherein said forming of said article is done after said exposing of said article to a dopant and after said said oxidizing or reducing said article.

7. A method according to claim 1 wherein said forming of said article is done before exposing said article to a dopant and before oxidizing or reducing said article.

8. A method according to claim 1 wherein said precursor to an electrically conductive polymer is polyaniline in undoped from.

9. A method according to claim 8 wherein said polyaniline in said nonreduced or nonoxidized form is in the emeraldine form.

10. A method according to claim 1 wherein said article is selected from the group consisting of a powder, a film, a fiber and a structural part.

11. A method according to claim 1 wherein said oxidizing is done by a process selected from the group consisting of chemical oxidation and electrochemical oxidation.

12. A method according to claim 1 wherein said reducing is done by a process selected from the group consisting of chemical reduction and electrochemical reduction.

13. A method according to claim 11 wherein said chemical oxidation uses oxidation agents elected from the group consisting of hydrazine, phenylhydrazine, other substituted hydrazines, titanium chloride, hydrogen,lithium aluminum hydride, zinc and raney nickel.

14. A method according to claim 12 wherein said chemical reducing uses oxidation agents selected from the group consisting of FeCl3, hydrogen peroxide, oxygen, periodates, potassium dichromate, ammonium peroxydisulfate and peracids.

15. A method according to claim 14 wherein said periodate is sodium periodate.

16. A method according to claim 14 wherein said chromate is potassium dichromate.

17. A method according to claim 1 wherein said exposing of said article to a dopant is done before said oxidizing or reducing of said article.

18. A method according to claim 1 wherein said exposing of said article to a dopant is done after said oxidizing or reducing of said article.

19. A method according to claim 1 wherein said exposing of said article to a dopant is done at the same time as said oxidizing or reducing of said article.

20. A method according to claim 1 wherein said forming of said article is done after said exposing of said article to a dopant.

21. A method according to claim 1 wherein said forming of said article is done after said exposing of said article to a dopant and after said said oxidizing or reducing said article.

22. A method according to claim 1 wherein said forming of said article is done before exposing said article to a dopant and before oxidizing or reducing said article.

23. A method according to claim 1 wherein said precursor to an electrically conductive polymer is polyaniline in undoped from.

24. A method according to claim 23 wherein said polyaniline in said nonreduced or nonoxidized form is in the emeraldine form.

25. A method according to claim 1 wherein said article is selected from the group consisting of a powder, a film, a fiber and a structural part.

26. A method according to claim 1 wherein said oxidizing is done by a process selected from the group consisting of chemical oxidation and electrochemical oxidation.

27. A method according to claim 1 wherein said reducing is done by a process selected from the group consisting of chemical reduction and electrochemical reduction.

28. A method according to claim 25 wherein said chemical oxidation uses oxidation agents elected from the group consisting of hydrazine, phenylhydrazine, other substituted hydrazines, titanium chloride, hydrogen,lithium aluminum hydride, zinc and raney nickel.

29. A method according to claim 27 wherein said chemical reducing uses oxidation agents selected from the group consisting of $FeCl_3$, hydrogen peroxide, oxygen, periodates, potassium dichromate, ammonium peroxydisulfate and peracids.

30. A method according to claim 29 wherein said periodate is sodium periodate.

31. A method according to claim 29 wherein said chromate is potassium dichromate.

32. A method according to claim 29 wherein said peracids are selected from the group consisting of m-chloroperoxybenzoic acid and lead acetate.

33. A method comprising:
   providing polyaniline in emeraldine form;
   reducing said emeraldine form to a deaggregated leucoemeraldine form;
   forming an article from said deaggregated leucoemeraldine form;
   doping said deaggregated leucoemeraldine form;
   oxidizing said leucoemeraldine form to emeraldine form.

34. A method comprising the following steps in sequence:
   providing polyaniline in emeraldine form;
   oxidizing said emeraldine form to a deaggregated pernigraniline form;
   forming a shaped article from said deaggregated pernigraniline form;
   doping said pernigraniline form shaped article;
   reducing said deaggregated pernigraniline form shaped article to emeraldine form shaped article.

35. A method comprising:
reducing or oxidizing a precursor to an electrically conductive polymer in substantially nonreduced or nonoxidized form to an intermediate reduced or oxidized form;
forming an intermediate reduced or oxidized form;
exposing said intermediate reduced or oxidized form to a dopant;
oxidizing or reducing said intermediate reduced or oxidized form to form a doped polymer in substantially nonoxidized or nonreduced form.

36. A method comprising:
reducing or oxidizing an electrically conductive polymer in substantially nonreduced or nonoxidized form to an intermediate reduced or oxidized form;
forming an intermediate reduced or oxidized form;
oxidizing or reducing said intermediate reduced or oxidized form to form a doped polymer in substantially nonoxidized or nonreduced form.

37. A method according to claim 35 wherein said intermediate reduced or oxidized form is in the solid state.

38. A method according to claim 37 wherein said solid state is selected from the group consisting of a powder, a film, a fiber and a structural part.

39. A method according to claim 38 wherein intermediate reduced or oxidized for is in solution.

40. A method according to claim 35 further including forming an article from said intermediate reduced or oxidized form.

41. A method according to claim 36 wherein said intermediate reduced or oxidized form is in the solid state.

42. A method according to claim 41 wherein said solid state is selected from the group consisting of a powder, a film, a fiber and a structural part.

43. A method according to claim 36 wherein intermediate reduced or oxidized for is in solution.

44. A method according to claim 36 further including forming an article from said intermediate reduced or oxidized form.

45. A method comprising: forming an emeraldine base solution, adding to said emeraldine base solution a reducing agent or an oxidizing agent or treating said emeraldine base solution electrochemically by applying a potential to convert the emeraldine polymer in solution to the leucoemeraldine base or to the pernigraniline base in solution, said leucoemeraldine base or pernigraniline base in solution is then processed flito an article, said article is then treated with a dopant and an oxidant or reducing agent to reform the doped emeraldine form of the polymer.

46. A method comprising: providing a doped emeraldine salt in the solid state form or in solution and reducing the doped polymer or oxidizing the doped polymer or treating it electrochemically to form the leucoemeraldine or pernigraniline form in the presence of a dopant, the reduced or oxidized form of the polymer is then reconverted to the emeraldine polymer, while in the reduced or oxidized form, the polymer in solution or solid sate is processed further by thermal or mechanical processing prior to conversion to the emeraldine form.

47. A method according to claim 1 wherein said polymer is a polyaniline having structural formula:

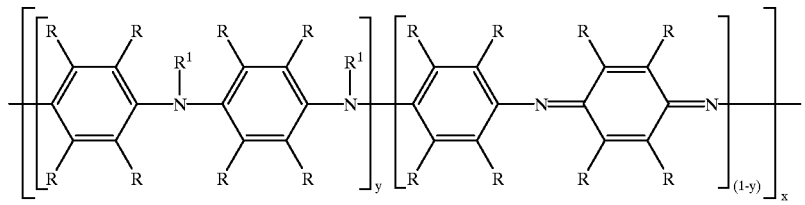

wherein each R can be H or any organic or inorganic radical; each R can be the same or different; wherein each $R^1$ can be H or any organic or inorganic radical, each $R^1$ can be the same or different; $x \geq 1$; preferably $x \geq 2$; y has a value of 0.5 for said reduced or nonoxidized form; y has a value from greater than 0.5 to 1 for said reduced form and y has a value from less than 0.5 to 0 for said oxidized form.

48. A method according to claim 1 wherein said polymer is a polyaniline having structural formula:

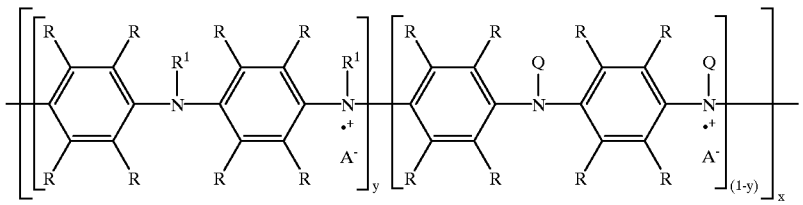

wherein each R can be H or any organic or inorganic radical; each R can be the same or different; wherein each $R^1$ can be H or any organic or inorganic radical, each $R^1$ can be the same or different; $x \geq 1$; preferably $x \geq 2$; y has a value of 0.5 for said reduced or nonoxidized form; y has a value from greater than 0.5 to 1 for said reduced form and y has a value from less than 0.5 to 0 for said oxidized form.

49. A method according to claim 1 wherein said article is stretch oriented.

50. A method according to claim 1 wherein said article is stretch oriented.

* * * * *